United States Patent
Chardonnens et al.

(10) Patent No.: US 10,557,702 B2
(45) Date of Patent: Feb. 11, 2020

(54) ARTICULATING HEAD FOR OPTICAL PROBES, COORDINATE MEASURING SYSTEM, AND TOOL HOLDER

(71) Applicant: TESA SARL, Renens (CH)

(72) Inventors: Julien Chardonnens, Bulle (CH); Léonard Wunderlin, Tolochenaz (CH); Jean-Luc Viret, Ependes (CH)

(73) Assignee: TESA SARL, Renens (CH)

( * ) Notice: Subject to any disclaimer, the term of this patent is extended or adjusted under 35 U.S.C. 154(b) by 170 days.

(21) Appl. No.: 15/853,039

(22) Filed: Dec. 22, 2017

(65) Prior Publication Data

US 2018/0356206 A1 Dec. 13, 2018

Related U.S. Application Data

(60) Provisional application No. 62/518,552, filed on Jun. 12, 2017.

(51) Int. Cl.
*G01B 11/03* (2006.01)
*G01B 11/00* (2006.01)

(52) U.S. Cl.
CPC .................. *G01B 11/007* (2013.01)

(58) Field of Classification Search
CPC ..................................................... G01B 11/007
USPC ............................................................ 33/503
See application file for complete search history.

(56) References Cited

U.S. PATENT DOCUMENTS

| | | | |
|---|---|---|---|
| 4,963,728 A * | 10/1990 | Hof ...................... | G01B 11/007 250/227.11 |
| 7,282,017 B2 | 10/2007 | Jordil et al. | |
| 8,535,208 B2 | 9/2013 | Jordil et al. | |
| 9,127,929 B2 | 9/2015 | Siercks et al. | |
| 9,494,403 B2 | 11/2016 | Rouge et al. | |
| 9,494,413 B2 | 11/2016 | Vuilloud et al. | |
| 2003/0130101 A1* | 7/2003 | Hwang .............. | B23Q 3/15553 483/59 |
| 2005/0014620 A1* | 1/2005 | McMurtry .......... | B23Q 1/5481 483/59 |
| 2011/0229091 A1 | 9/2011 | Jensen et al. | |
| 2015/0204653 A1* | 7/2015 | Przygodda .......... | G01B 21/045 33/503 |
| 2016/0076867 A1 | 3/2016 | Ruck et al. | |
| 2017/0030702 A1 | 2/2017 | Jensen et al. | |
| 2017/0191815 A1 | 7/2017 | Chardonnens et al. | |
| 2018/0112971 A1* | 4/2018 | Jensen ................. | G01B 11/005 |
| 2018/0299250 A1* | 10/2018 | Kay .................... | G01B 9/02035 |
| 2018/0364026 A1* | 12/2018 | Sesko ................. | G01B 11/007 |
| 2019/0107383 A1* | 4/2019 | Ruck ...................... | G01B 7/012 |
| 2019/0285398 A1* | 9/2019 | Habrich ............... | G01B 11/007 |

FOREIGN PATENT DOCUMENTS

| | | |
|---|---|---|
| DE | 10 2005 061 464 B4 | 3/2012 |
| EP | 2 037 214 A1 | 3/2009 |
| EP | 2 356 401 A1 | 8/2011 |
| FR | 2 738 343 A1 | 3/1997 |

* cited by examiner

*Primary Examiner* — George B Bennett

(74) *Attorney, Agent, or Firm* — Maschoff Brennan

(57) ABSTRACT

An articulating probe head for a coordinate measuring machine (CMM) comprising an optical fiber and an interface for automatic connection to an optical coordinate probe. A tool rack for a CMM for storing tactile and/or optical probes for automatic exchange on the said probe head. Two methods are also described to verify the quality of the optical waveguide from controller to the probe tip.

16 Claims, 3 Drawing Sheets

ARTICULATING HEAD FOR OPTICAL PROBES, COORDINATE MEASURING SYSTEM, AND TOOL HOLDER

REFERENCE DATA

The present application claims the benefit of provisional patent application 62/518,552 of 12 Jun. 2017, the contents whereof are incorporated by reference in their entirety.

FIELD OF THE INVENTION

The present invention concerns, in embodiments, the field of accessories for coordinate position and measuring systems and notably accessories which integrate optical systems for non-contact measurement of coordinates interchangeably with tactile measurements. Preferably the measurements are performed in automated fashion including the automatic interchange of a plurality of optical and tactile probes appropriate for 3D measurements of a workpiece.

RELATED ART

Tactile probes are widely used in combination with coordinate measuring machines (CMM) for measuring and checking the dimensions and the surface state of machined parts. Such systems typically comprise a probe head with 2 or more axes of rotation which is fastened to the mobile arm of a CMM. A tactile probe, of trigger or scanning type, is attached to the probe head and is brought into contact with the workpiece at selected points through the combined motions of the CMM and the angular orientation of the probe head. Generally, several types of tactile probes, of different sensitivity or length or geometry are required for the measurements and they are disposed on a magazine for automatic interchange as commanded by the CMM controller. U.S. Pat. No. 9,494,403 describes a probe head with 2 axes of rotation and U.S. Pat. No. 7,282,017 describes automatic switching of tactile probes on a probe head.

Recently, the use of optical measuring sensors in CMMs has been developed for non-contact measurements of comparable precision to tactile ones. The optical sensors used for this purpose are based on irradiation of, for example, laser light onto an object surface for interferometric measurements (EP2 037 214). Methods based on white light interferometry (DE10 2005 061 464) and chromatic-confocal methods (FR273 8343) are also known.

EP 2356401 describes an optical measuring probe which combines the mechanical coupling elements of a tactile probe with an optical interface on the side which is connected manually to an optical fiber to transmit and receive signals from an optical controller commanded by the CMM.

The optical sensors, which can measure typically at 1 kHz rate, have a speed advantage over the tactile ones. On the other hand, optical sensors, in particular high-precision interferometric ones, operate within narrow ranges of working distances and reflection angle from the surface being measured. Therefore, a plurality of different types of optical probes are required, as for tactile ones, to accurately measure workpieces of complex shapes. Manual connection of the optical interface at each probe exchange slows down the measurement process significantly.

Consequently, there is a need for an automatic exchange of optical probes on a probe head during CMM measurements. Preferably, the probe head is operable both with tactile and with optical probes, interchanging them automatically as required by the CMM control program.

US 2016/0076867 describes a CMM accessory comprising a first changing interface to couple a sensor with a carrier structure on the CMM and a second interface for coupling a cable element with the carrier structure. The two interfaces are spatially separated and are connected in sequential fashion. The possibility of a one-step connection of both interfaces is mentioned however no description is given of the precise alignment mechanism that would be required, in particular for an interferometric optical probe.

BRIEF SUMMARY OF THE INVENTION

It is an aim of the present invention to provide an integrated optical system in a CMM which allows automatic exchange of optical as well as tactile probes on the same probe head for precision measurements.

Another aim of the present invention is to assure the integrity of the optical waveguide by threading an optical fiber through the various component parts.

A further aim of the present invention is to provide a method for verifying the quality of the optical waveguide by analyzing the light reflected back from the tip of the probe or from other discontinuities along the fiber.

According to the invention, these aims are achieved by means of the object of the appended claims.

In the following description, the terms 'above', 'below', 'vertical', and other similar wording are used with reference to a conventional orientation of the articulating head of the invention, as it is represented in the drawings. It is important to realize, however, that the articulating head of the invention can be used in any orientation in space and that these terms are used only to improve the readability of the description, no limitation to the invention being implied

SHORT DESCRIPTION OF THE DRAWINGS

The description discloses exemplary embodiments of the invention illustrated by the drawings which show:

FIG. 1 shows, in perspective and in section, an articulating positioning head;

FIGS. 2 and 3 show the interface connector between a positioning head and an optical probe, respectively a positioning platform in a CMM FIGS. 4 and 5 illustrate a touch probe station and an optical probe station for a rack of automatic probe change. The optical probe station is also shown with a protection cover retracted and in section in FIGS. 6 and 7.

DESCRIPTION OF EMBODIMENT(S) OF THE INVENTION

Figure 1:
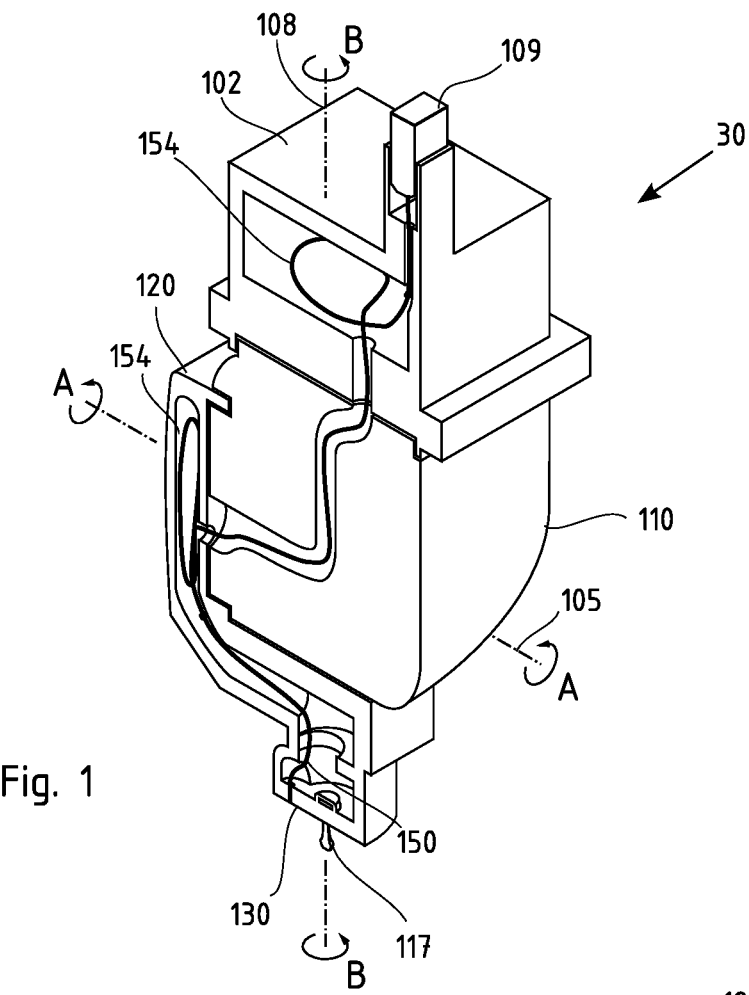

The present invention concerns an articulating probe head and a rack for storing interchangeable probes and tools for a CMM. FIG. 1 shows a possible realization of the probe head that has a support 102 that is connected, in operation, to a movable platform of a coordinate measuring machine.

Figure 9:
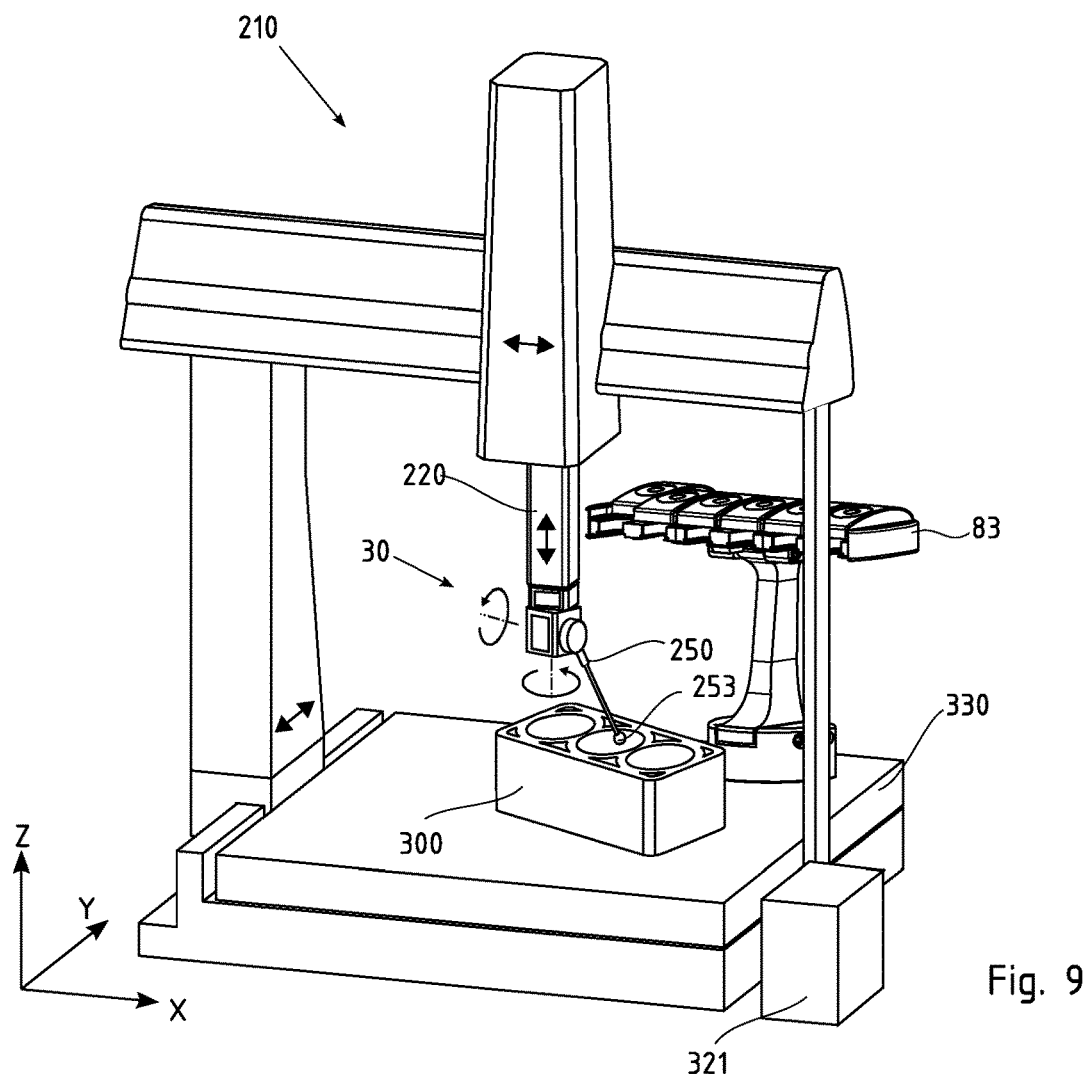
FIG. 9 shows a CMM with an articulating head carrying a contactless probe and a tool rack.

FIG. 9 illustrates a coordinate measuring system comprising a CMM 210 for measuring coordinates of points on the surface of a workpiece 300 placed on a reference surface 330. The CMM comprises a mobile platform 220 that can be moved to any desired point in a predefined measuring volume. In this example, the machine has a gantry structure, and three linear actuators (not visible) that can move the positioning platform 220 along each of the coordinate axes X, Y, Z. The motion of the positioning platform is supervised by a controller 321 that may be programmed to follow a predetermined measuring sequence.

The movable platform 220 is releasably connected to a support element of an articulating probe head 30.

Returning to FIG. 1, the support element 102 is connected to a first mobile element or rotor 110 that is capable of turning relative to the support about the vertical 'B' axis 108. The rotation of the first rotor is preferably automatic, for example thanks to an electric motor, under the supervision of the controller 321 of the CMM. In a possible embodiment, the first rotor can be set in a locked state in which it is firmly seated in one of a plurality of indexed angular positions, or in an unlocked state, wherein it can rotate, under the action of the motor, about the axis 'B'. Unlocking and locking, are determined by suitable automatic actuators inside the articulating head and can be piloted by the CMM controller, as for the rotation motor. In another embodiment the articulating probe head can be of continuous type instead of indexed, with the "locked" and "unlocked" positions corresponding to the rotor being blocked or released for rotation. U.S. patent application Ser. No. 15/358,126 by the applicant describes yet another embodiment where the two rotation axes are replaced by a spherical joint.

The probe head comprises as well a second mobile rotor 120 connected to the first one, and rotatable relative to the first rotor about a second axis 'A' 105 orthogonal to the first axis 'B'. The second rotor is also settable in a locked state or in an unlocked state. The actuator that locks and unlock the second rotor could act in the same manner and at the same time on the locking of the first rotor, or be an independent one. Once unlocked, the rotors 110 and 120 can preferably turn each about the respective axis under the action of separate motors.

The second rotor 120 carries a distal connector 130 for connection with an optical coordinate probe. To assure the integrity of the optical path, an optical fiber 150 is threaded through the articulating probe head from the distal connector 130 to the optical connector 109 in the support 102. Thus, the articulating probe head allows the use of optical devices on the coordinate measuring machine. The machine controller can therefore position the optical device in any desired position in X, Y, Z, select its orientation by the rotation axes A and B, and perform optical measurements through the fiber 150.

Preferably the optical probe attached to the distal interface 130 is an interferometric coordinate probe (visible as 250, 253 in FIG. 9), and may have a simple beam or multiple optical beams for non-contact coordinate measurement. A probe suitable for this application is described in U.S. patent application US20110229091 which is incorporated herein by reference. The connector, however, is compatible also with other optical devices, not necessarily limited to coordinate probes. Among the coordinate sensitive equipment that could be used on the probe head of the invention are confocal chromatic probes, laser triangulation probes, and laser scanners. The system may also be used with high-power lasers for cutting or engraving, or with a telecommunication laser, for transmitting digital data. The present application will refer exclusively to an optical coordinate probe, for simplicity, but it should be understood that the optical probe could be replaced by a generic optical device.

For an optimal performance of the interferometric probe, bending and twisting of the fiber should be limited as much as possible. The fiber is fixed at two points in the first and second rotors, while it is loose in the center of the probe head to allow rotation about the A and B axes in a ±180° range with acceptable torsion. In particular, the distance between the 2 fixed points must not be smaller than approximately 10 cm. The fiber model HI 1060 Flex produced by Corning can tolerate bending to a radius of 5 mm and is suitable for the present application. The assembly of the probe head with the fiber threaded inside requires an extra length of fiber which is coiled in two loops 154 in the first and second rotors once the connectors 130 and 109 are fixed onto the fiber end.

An alternative embodiment for obtaining an optical path through a rotary system uses slip rings, as described in U.S. Pat. No. 9,494,413 by the applicant. A further alternative embodiment employs a fiber coil which is uncoiled or re-coiled during the rotary motion of the probe head.

Figure 3:
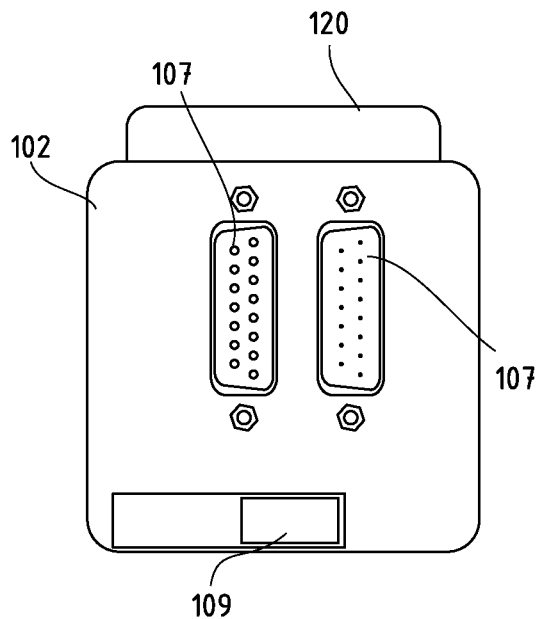

The probe head is connected to a positioning platform in a CMM by electrical 107 and optical 109 connectors, as shown in FIG. 3.

The optical connection in the distal connector 130 is obtained by a ferrule, preferably rigidly mounted in a coaxial guiding cone of hard metal. The mating ferrule in the optical probe is preferably spring-loaded and allows a slight rotation so that the 4° beveled surfaces match and good optical contact is made.

Figure 2:
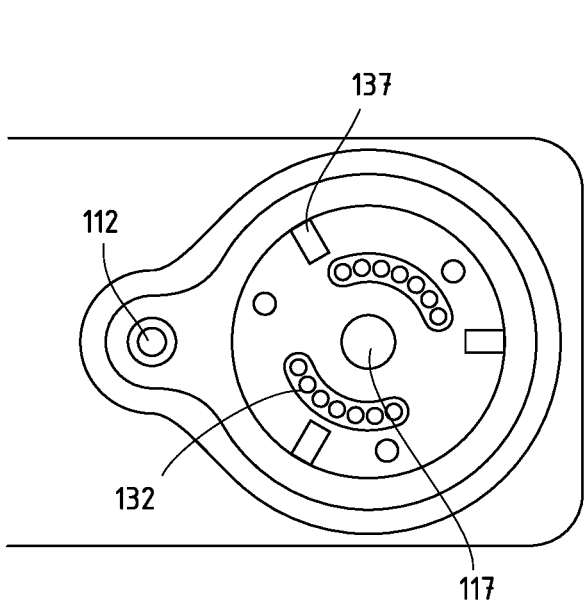

The position of the optical port in the distal connector is marked by reference 112 in FIG. 2. Axially, the metallic nipple 117 is designed to interoperate with an axial hole in the female counterpart of the optical probe, and is retained and pulled axially by an arrangement of jaws in the optical probe, as described in US20170030702. The three horizontal pins 137 interoperate with three pair of spherical surfaces on the probe and assure a precise and repeatable mechanical mating. Therefore, no additional locking mechanism is required for the optical connectors 112 and 130 to maintain good optical contact during the measurements. The contact points 132 are used for electrical connection between the probe head and the probe.

Although the distal connector 130 can easily be operated manually, an automatic tool change system is often desirable, to optimize the productivity of a CMM system. FIG. 9 shows a tool rack 83 associated with the CMM 210, inside the space accessible by the positioning platform 220 and in which the machine can place a tool at the end of a measurement operation, and retrieve a tool required for the next task. The CMM can thus perform complex measurement following a sequence of programmed movement, or upon manual commands of the operator, using a plurality of tools. U.S. Pat. No. 8,535,208 describes a similar arrangement.

Figure 4:
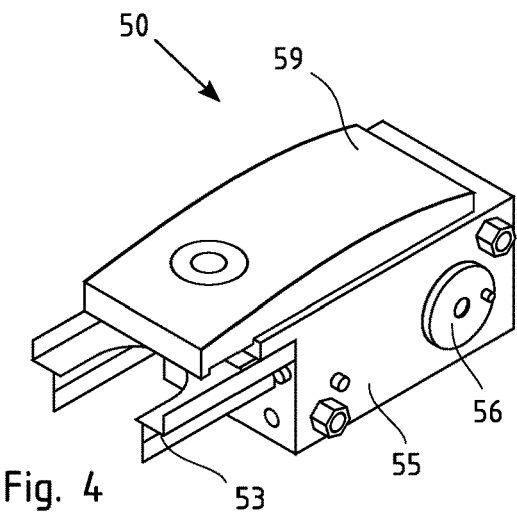
Figure 7:
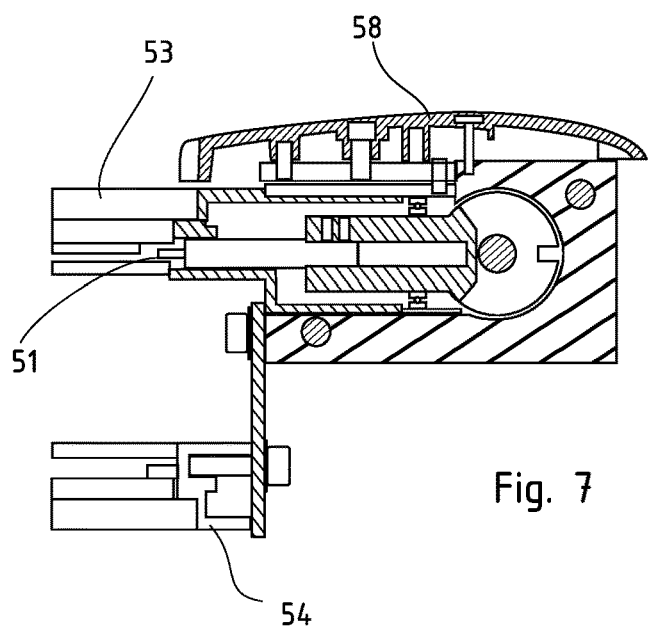

FIG. 4 shows a probe station 50 that could be mounted in a tool rack 83 as described in U.S. Pat. No. 7,282,017, and is suitable for conventional tactile probes. In this tool station, the probe is maintained by the rails 53 that interoperate with a groove in the probe body, and the connector of the probe is protected, when not in use, by the slider 59. The CMM probe head can be programmed to insert a probe in the station 50, approaching from a direction parallel to the rails 53, and pushing back the slider 59 in the process. The separation of the probe from the head is done by an automatic screwdriver 51 (visible in FIG. 7) actuated by shaft 56 that releases the probe by acting on a screw on its side, whereby the CMM can move away from the probe vertically. The slider 59 can be locked in retracted position by means of the locking screw 57 in order to facilitate the CMM qualification process.

In the loading process, the CMM can collect a probe from the station 50 repeating the same steps in the reverse order.

Figure 5:
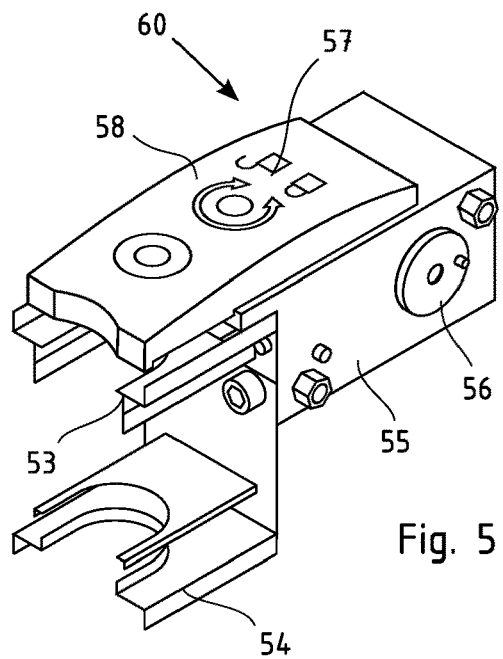
Figure 6:
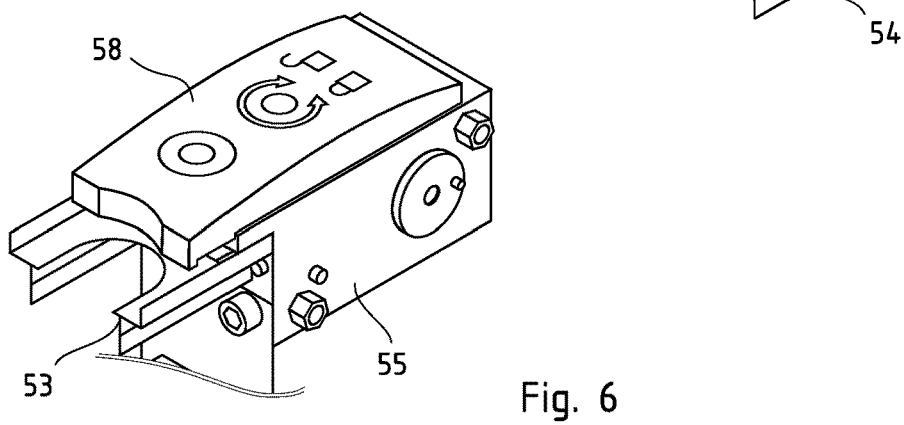

FIG. 5 shows a probe station 60 suitable for a non-contact optical probe. The top cover 58 is extended to cover the optical fiber of the optical probe when not in use. Furthermore, it has a second rail 54 parallel and below the first one 53. This is required to counteract the spring force when the two ferrules approach each other, which would tend to tilt the probe in the rack. The ferrule in the probe is guided towards the fixed ferrule in the probe head and rotates slightly, under the spring force, until the 4° beveled surfaces match and establish a clear optical path.

After each tool change, the optical probe is read by a controller that measures the fractional intensity of the light that is reflected from the probe tip, which is free in air. If the power is below a predetermined threshold, the CMM operator is instructed to clean the fiber tip on the probe head and on the probe, which can be made with a suitable cleaning pen. This power measurement also detects if the fiber inside the probe head is damaged and, in this case, issues a specific warning to the operator.

Figure 10:
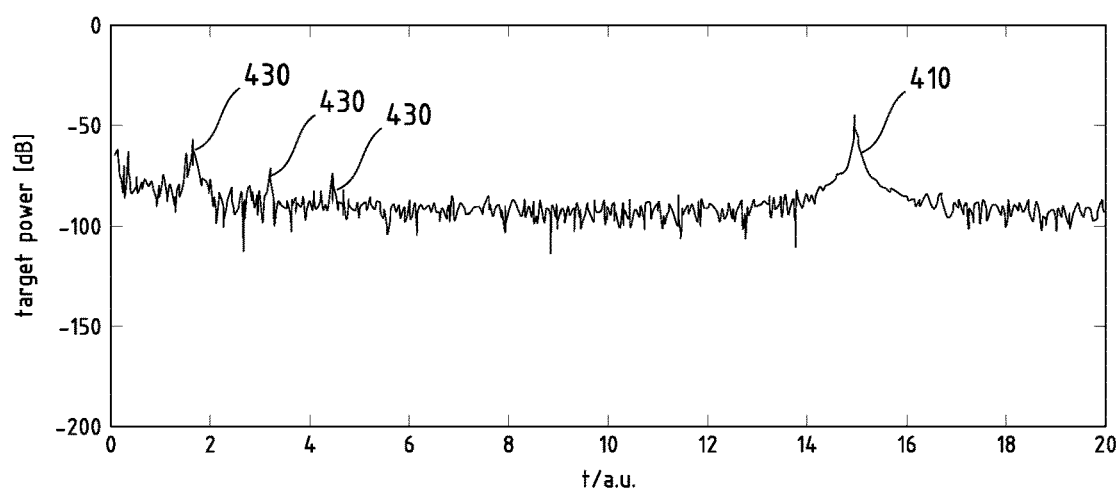
FIG. 10 is a plot of a typical tomographic signal generated by an interferometric optical probe.

For an interferometric probe with a frequency modulated laser beam, as described in EP2037214 for example, the interference signal can be analyzed to identify the tip of the optical probe where the laser exits into air thanks to a partial internal reflection (local oscillator) which serves as the reference for the subsequent distance measurements to a workpiece. FIG. 10 shows a typical tomographic signal where the peak 410 corresponds to the exit point.

In addition to the exit point, the tomographic data displayed in FIG. 10 can show other peaks 430 at locations along the optical fiber 150 where partial reflection occurs due to optical discontinuities. The amplitude of each peak is indicative of the amplitude of the reflected signal while its position along the horizontal axis indicates the location along the fiber 150. If the amplitude of a peak is above a preset level, the controller can prompt the operator to intervene. If the location corresponds to an optical connector then the operator can be asked to clean it. If no connector is present at the indicated location, the reflection could indicate a damaged fiber and service may be required.

The procedure of probe change is identical to that of the tactile probes, described above and, more in detail, in U.S. Pat. No. 7,282,017.
  a. The optical probe is inserted in a predetermined position into the upper and lower rails with the locking screwdriver (51) of the station engaged with the screw on the side of the probe body.
  b. The probe head approaches the station horizontally at a predetermined height, and pushes back the cover by a preset amount.
  c. The probe head then moves down onto the optical probe such that he center nipple is inserted in the matching hole of the probe. At the same time the two ferrules are guided toward each other and make contact with the fiber cores aligned.
  d. Once contact is made, the screwdriver 51 turns to lock the probe on the head (the central nipple is grabbed by the jaws in the probe).
  e. The probe head moves back horizontally, carrying the optical probe out of the rails.

Preferably, the optical probe station 60 is compatible with a conventional tactile probe and can assure the automatic exchange of tactile probes as well. In addition to optical or tactile probes, the station can also hold probe extensions, either for tactile probes or for optical ones, which have the same interface as the probe head (female on one side and male on the other).Thus the probe head can pick one or several extensions in succession and then a probe at the end.

Figure 8:
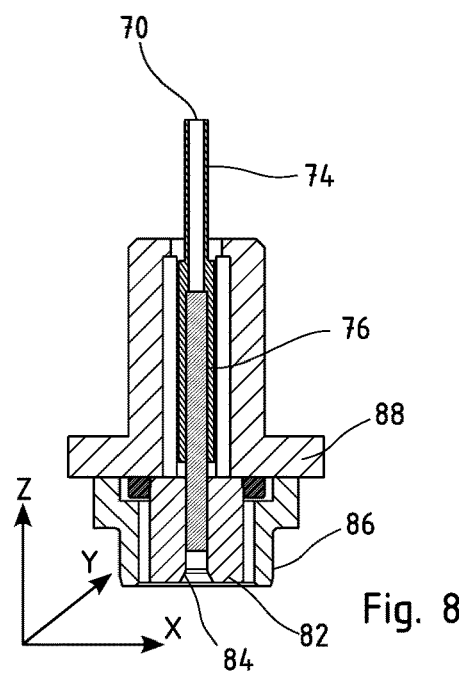
FIG. 8 illustrates a fiber connector.

FIG. 8 shows a preferred realization of the optical connector 112. From the upper port 70 the fiber is guided by the metal sleeve 74 into the ceramic ferrule 76. The metal sleeve has a socket in its lower part into which the ferrule 76 fits precisely, in order to assure exact coax alignment between the sleeve and the ferrule.

Preferably, the ferrule is free to rotate around the general axis of the fiber (vertical and marked "Z") and the sleeve can rotate around the same "Z" axis by at least a limited angle, for example ±2°, to align the beveled faces of the fiber.

The lower part of the ceramic ferrule 76 fits into a floating element 82 that is constrained in the horizontal plane by resilient elements, such that it is capable of movements in the directions orthogonal to the general axis of the fibre 70 (horizontal and marked "X-Y" in the drawing) while abutting against the upper bushing 88. The lower bushing 86 limits the horizontal movements of the floating element 82. The floating element has a lower aperture for mating with an optical fiber that ends in an insertion cone 84.

REFERENCE NUMBERS 30 articulating head
50 touch probe station
51 automatic screwdriver
53 upper rail
54 lower rail
55 station body
56 shaft
57 locking screw
58 optical probe cover
59 touch probe cover
60 optical probe station
70 fiber port
74 sleeve
76 ferrule
82 floating element
83 tool rack
84 cone
86 front bushing
88 upper bushing
102 support
105 'A' axis
107 electrical connectors
108 'B' axis
109 optical port to the CMM
110 first rotor
112 optical port to the probe
117 nipple
120 second rotor
130 distal connector
132 electrical contact pads
137 positioning pins
150 optical fiber
154 fiber loop
210 CMM
220 XYZ positioning platform
250 contactless probe
253 probe tip
300 workpiece
321 controller
330 reference surface
410 partial reflection from tip
430 partial reflections from discontinuities

The invention claimed is:
1. Articulating probe head for orienting an optical coordinate probe, comprising, a support releasably connectable to a positioning platform of a coordinate measuring machine, a first rotor rotatably connected to the support for rotation about a first axis, a second rotor, rotatably connected to the first rotor for rotation about a second axis perpendicular to the first axis, a distal connector for releasably connecting an optical coordinate probe, a first motor and a second motor, for rotating the first, respectively second rotors about the first respectively second axis, and an optical fiber, connecting a first optical port in the distal connector, for connection to the optical coordinate probe, to a second optical port in the support, for connection to the CMM.

2. The articulating probe head of claim 1, wherein said optical fiber is threaded through the two rotary axes and fixed at two points to minimize its bending and twisting.

3. The articulating probe head of claim 2, wherein the length of the optical fiber between the two fixed points is at least 5 cm.

4. The articulating probe head of claim 3, wherein said optical fiber comprises a loop coiled inside the first rotor, and/or the second rotor and/or the support.

5. The articulating probe of head claim 1, comprising an indexing mechanism for locking the first rotor and/or the second rotor in a selectable angular position.

6. The articulating probe head of claim 1, comprising a third axis of rotation through which the optical fiber is threaded for connection to a probe.

7. A method of verifying the quality of the tip of the optical probe comprising the steps of: a) measuring the total power reflected from the tip of the probe in air, b) calculating the ratio of the total reflected power to the emitted power, and c) if the ratio is below a preset threshold, instructing the operator to clean the tip of the optical probe.

8. A method of verifying the integrity of the optical path from the optical controller to the tip of the optical probe comprising the steps of: a) analyzing the interferometric signal in coarse scale to identify peaks corresponding to partial reflections of the beam along the optical path, b) calculating the amplitude of such peaks, c) if the amplitude is above a preset threshold, indicating to the operator the location where the reflection occurs and d) instructing the operator to clean a corresponding connector or to initiate service action.

9. A tool rack for automatic loading and unloading of tools on and from a movable arm of a CMM comprising a plurality of tool stations, including an optical probe station having two rails one below the other for holding an optical coordinate probe.

10. The tool rack of claim 9 comprising an automatic actuator for locking the tools on the movable arm when loading, and unlocking the coordinate probe from the movable arm when unloading.

11. The tool rack of claim 9, the optical probe station comprising a sliding cover for protecting a top optical port of the optical coordinate probe when stored in the magazine.

12. A system comprising a coordinate measuring machine, having a positioning platform, an articulating probe head comprising, a support releasably connected to the positioning platform, a first rotor rotatably connected to the support for rotation about a first axis, a second rotor, rotatably connected to the first rotor for rotation about a second axis perpendicular to the first axis, a distal connector releasably connected to an optical coordinate probe, a first motor and a second motor, for rotating the first, respectively second rotors about the first respectively second axis, and an optical fiber, connecting a first optical port in the distal connector, for connection to the optical coordinate probe, to a second optical port in the support, for connection to the CMM probe head, the system further comprising a rack with a plurality of tool stations, each capable of lodging a measuring tool releasably connectable to said distal connector of the articulating probe head.

13. The system of claim 12, wherein the tool stations are in a work space accessible to the positioning platform of the CMM, and are arranged to allow automatic loading and unloading of tools to the distal connector of the articulating probe head.

14. The system of claim 13, the rack including an optical probe station having two rails one below the other for holding an optical coordinate probe.

15. The system of claim 12 comprising in at least one tool station, an automatic actuator for locking the tools on the movable arm when loading, and unlocking the coordinate probe from the movable arm when unloading.

16. The system of claim 14, the optical probe station comprising a sliding cover for protecting a top optical port of the optical coordinate probe when stored in the tool rack.

* * * * *